(No Model.) 2 Sheets—Sheet 1.
J. W. CULMER.
COMPUTING SCALE POISE.
No. 487,824. Patented Dec. 13, 1892.
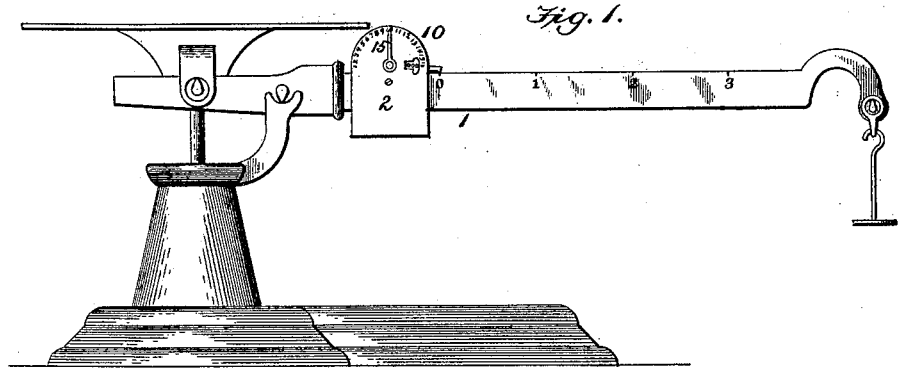
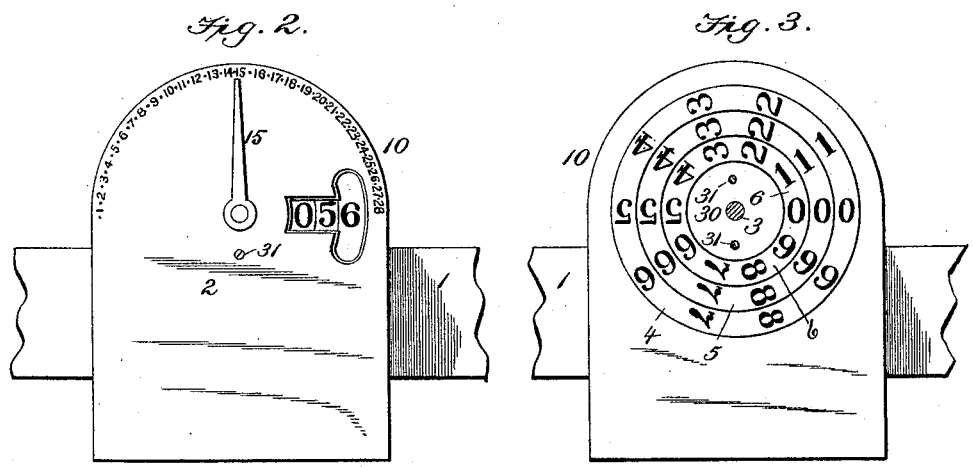
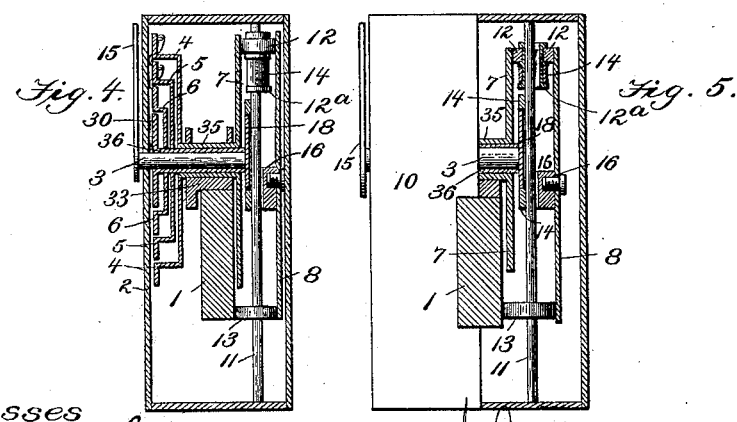
Witnesses
Inventor
John Woodruff Culmer
By Johnson & Johnson
his Attorneys.

(No Model.) 2 Sheets—Sheet 2.
J. W. CULMER.
COMPUTING SCALE POISE.
No. 487,824. Patented Dec. 13, 1892.
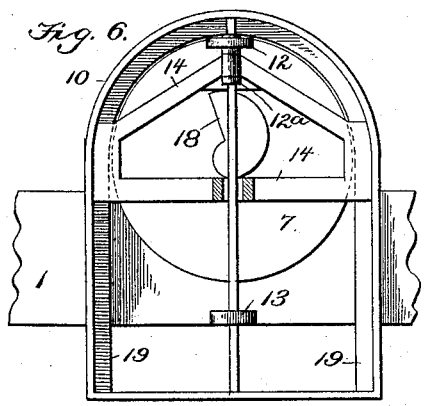
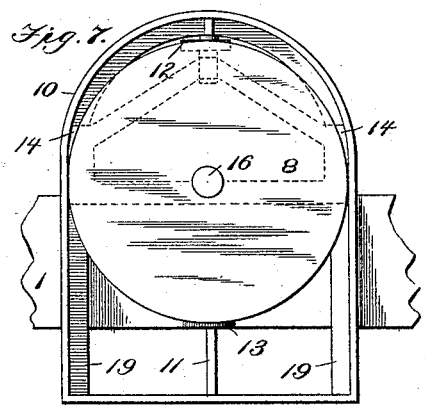
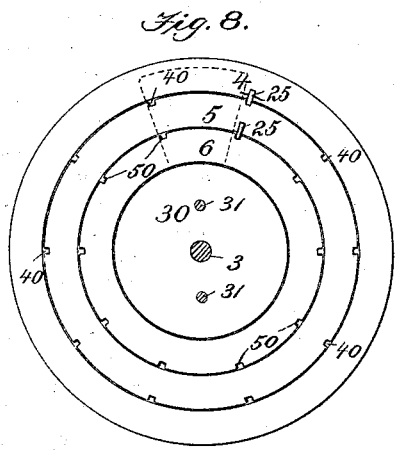
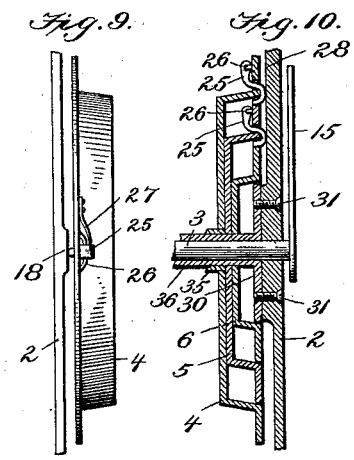
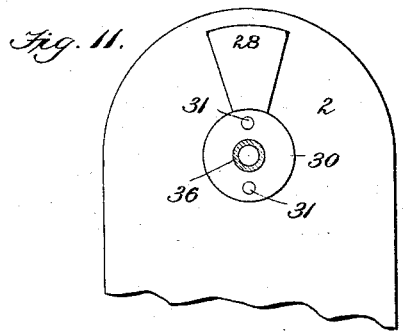
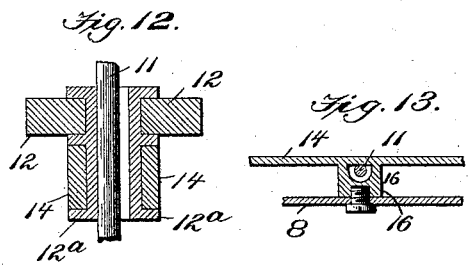
Witnesses
Inventor
his Attorneys.

UNITED STATES PATENT OFFICE.

JOHN WOODRUFF CULMER, OF NEW BRIGHTON, PENNSYLVANIA, ASSIGNOR TO THE COMPUTING SCALE COMPANY, OF DAYTON, OHIO.

COMPUTING SCALE-POISE.

SPECIFICATION forming part of Letters Patent No. 487,824, dated December 13, 1892.

Application filed February 15, 1892. Serial No. 421,590. (No model.)

*To all whom it may concern:*

Be it known that I, JOHN WOODRUFF CULMER, a citizen of the United States, residing at New Brighton, in the county of Beaver and State of Pennsylvania, have invented certain new and useful Improvements in Computing-Poise Devices, of which the following is a specification.

I have produced a computing-poise device which, so far as I know and can find, is a new device adapted, primarily, for use with weighing-scales in which the weight and the value are determined by the sliding of such poise device upon a beam or lever subdivided into fixed determined divisions, each of which represents and balances a fixed weight which may be placed upon the platform or scoop of the scales, but which device may be adapted for use in computing the value of articles measured by long measure and to certain other uses.

My said invention comprises a sliding device which contains in itself the computing mechanism, the operation of which is effected by the sliding of such device upon the scale-beam of a weighing-scale or the movement of such device in its adaptation for computing the value of articles otherwise measured. The computing-poise which I have shown is adapted for use with a scale-beam upon which it is fitted to slide, and it has a primary wheel or roll in contact therewith and receives motion by such contact in a positive relation to the distance through which the poise is moved upon said beam; it has a primary disk which is in contact with said wheel or roll and receives positive motion therefrom; it has a secondary roll or wheel supported in contact with said disk and movable radially therewith and receives motion therefrom; it has a secondary disk in parallel plane with the first referred-to disk which is in contact with and receives motion from the said radially-movable roll; it has a series of decimally-divided disks arranged in a nest, of which the first or unit member is fixedly attached to the secondary disk and in which the series are operated in the well-known "register" system, and, finally, the computing-poise has a price-pointer and mechanism for changing the relation of the fixed motion of the primary wheel or roll and the disk operated thereby relatively to the secondary disk and its connected series of decimal-disks, whereby in the organization of these connecting parts the computation of varying weights at different prices may be effected and indicated.

The accompanying drawings illustrate my computing-poise device, and in them Figure 1 illustrates its application to ordinary trip-beam weighing-scales. Fig. 2 is a front view of a computing-poise of my invention upon a broken piece of a scale-beam and showing the value and price numerals. Fig. 3 is a vertical front view of the same with the face-plate and the price-indicating pointer removed. Fig. 4 is a transverse section of the same. Fig. 5 is a partial transverse section of the same. Fig. 6 is a rear view of the same with the back plate and primary disk removed. Fig. 7 is a similar view with the disk in place and back plate removed. Fig. 8 shows the nest of decimal-disks and pawls by which they are engaged with each other for rotation. Fig. 9 is a top edge view of the same and of the front plate, and Fig. 10 is a vertical cross-section of the decimal-disks, showing their engaging pawls. Fig. 11 shows the projection 28 on the inner side of the face-plate for operating the pawls 25 to engage the decimal-disks. Fig. 12 is a detail sectional view of the secondary roll and its spindle-sleeve; and Fig. 13 shows the connection of the primary disk 8 with the yoke-frame 14, which carries said disk over the spindle 11.

A box or frame 10, constructed, preferably, of brass plates, is fitted with an interior saddle 33, Fig. 4, whereby to form a proper seat for the device on the scale-beam 1, on which it is permitted to slide by openings in the opposite sides of the box. This frame or box contains the complete mechanism necessary to make a computing-poise and which in the example shown is rendered operative to compute the value of an article being weighed by sliding the poise upon the weight-beam, as I will now describe.

At one side of the frame and preferably within the rear side of the box-chamber a vertical spindle 11 is stepped in the box-plates and has a primary roll 13 fastened thereon in position to make frictional or engaging contact with the side of the beam. At the rear side of the spindle a primary disk 8 is mounted in parallel relation to the spindle, so as to rotate freely upon a stud 16, which is vertically movable with said primary disk, so that the latter will have a compound movement, one of which (its rotation) is effected by its frictional contact with the said primary roll. A sliding movement of the poise on the beam will by the frictional contact therewith cause the said primary roll to rotate, which in turn rotates the said primary disk. A secondary disk 7 is mounted in rotative relation to the scale-beam parallel with the spindle and between it and the beam. The disk 7 is supported by a sleeve 35, which has a bearing in the saddle 33, which forms the seat for the frame-poise upon the scale-beam, and this secondary disk is rotated by the primary disk in a way which I will now state. A yoke-frame 14 is mounted to slide vertically in position between the disks in guides 19 19 on the inner walls at the opposite ends of the poise, as seen in Figs. 6 and 7. At its upper part this yoke-frame has a sleeve $12^a$, through which the vertical spindle 11 passes freely, and this sleeve has mounted on its upper end between shoulders a secondary roll 12, adapted to rotate freely thereon in frictional contact with the said primary and secondary disks, and receives its motion from the former, and is therefore rotated in a direction opposite to that of the primary roll, as will be seen in Figs. 4 and 12. The sleeve $12^a$ has its bearings in the yoke 14 and is retained in position thereon, so that the vertical movement of the yoke will carry with it the secondary roll 12 and the primary disk 8, because the stud 16, on which the latter is mounted, is a fixed part of the said yoke-frame, as seen in Fig. 13, in which the spindle is shown as passing through a hole in the yoke-stud 16.

The register system which I have shown consists of a series of decimal-disks numbered, respectively, 4, 5, and 6. The first or units disk 4, being the outer one, is fast on the outer end of the sleeve 35 of the secondary disk and is rotated thereby. I make these decimal-disks "cupped" and of decreasing diameter from the outer to the inner one, so that they will fit one within the other and present their numerals flush with the face-plate of the poised device. The two inner decimal-disks 5 and 6 are mounted and rotate freely on a sleeve 36, which is fitted to turn freely within the outer sleeve 35, and each of the said three disks is marked with the digits "1" to "0" and is divided into ten equal divisions, at the intersection of which the two inner disks are formed with peripheral notches, for a purpose which I will presently state. On its outer end the inner sleeve 36 has a fixed disk 30, which is made fast to the inner side of the face-plate 2 by screws 31, so that this sleeve does not rotate. A stem or rod 3 passes freely through this inner sleeve and at its outer end has a pointer 15, which is used with the price-digits, while at its inner end this rod has a fixed cam 18, (see Fig. 6,) which stands between and is in contact with cross-bars of the yoke-frame 14, so that the turning of the pointer to set it as desired will also rotate the cam, and in moving thereby the yoke-frame will carry with it the primary disk and the secondary roll 12, for a purpose which I shall presently state.

The face-plate has an opening to show the value-figures at the right of the decimal-disks and it is divided and numbered upon the arc described by the pointer into any approved set of subdivisions for indicating the price in connection with the value-figures. As I have described the means whereby the units-disk 4 is rotated, I will now state the means by which the inner disks are also rotated.

The decimal-disks 5 and 6 at points between the digits are formed with notches 40 and 50 at their circumference and at the radial division-lines, as before stated, and as seen in Fig. 8. The corresponding lines of the disks 4 and 5 at points between the digits are formed with corresponding notches, as in Figs. 8 and 10, and to the inner sides of these disks 4 and 5 pawls 25 are hung on pivots 26 between lugs, so that the lower ends of these pawls will project through the notches in the disks, to which they are hung, and will be pressed by springs 27, (see Fig. 9,) and held thereby out of engagement with the notches 40 and 50 in the disks 5 and 6. For this purpose I make the engaging ends of the pawls curved or hook-shaped, as seen in Fig. 10, so that being pivoted to the inner side of said disks and projecting through to their front sides will be held by springs 27 out of engagement, as stated. The provision for automatically engaging the pawls to permit one of the decimal-disks to rotate the next consists of a projection 28 on the inner side of the face-plate 2, so that when in its rotation the units-disk 4 brings the pawl 25 in contact with this projection the latter will act like a cam and force the pawl inward so as to engage the notch 40 in disk 5, which is thereby caused to move with the disk 4 until the projection 28 is passed and the pawl thrown out of said notch by the spring. A similar pawl is fitted to the disk 5, so that its inner end enters the notches 50 in the second disk 6, and is operated in the same manner by the revolution of the disk to bring the proper value-figures of all the disks at the face-opening.

In using the computing-poise with the weighing-scale the operator sets the poise at zero on the beam and the decimal-disks each show "0" at the face-opening. The pointer, if then set at 10 on the price-arc, will thereby move the cam 18, and thereby carry down the disk 8, the yoke-frame, and its connected roll 12 nearer to the center of the disk 7, and assuming the pound-divisions to be two inches apart, or any other fixed distance, the disk 7 and the decimal-disks 4, 5, and 6 will be moved ten times the distance upon their axis as they would if the pointer were placed at "1" on the price-arc and the roll 12 at the periphery of the disk 7. It will be seen that by moving the pointer so as to cause its connected cam to carry the disk 8, the yoke-frame, and its connected roll upward, the primary roll 13 being fixed relatively to the primary disk 8, the latter will have a slower rotation as it is moved upward and a more rapid rotation as it is moved downward by reason of its frictional contact with the said roll 13. This is evident because the secondary roll is moved up and down with the disk 8, and being in frictional contact therewith and with the disk 7 will impart motion to the latter, slow or rapid, as its contact with said roll is near its periphery or near its center. In a computing-poise thus constructed the movement of the pointer, being set at, say, "Ten cents a pound," will, if moved outward upon a beam, indicate at, say, three pounds "Thirty cents" and will as it is moved back to zero return its numbered disks to zero. In this operation the units-disk moves the second disk one-tenth of a revolution for each complete revolution of itself, and the second disk moves the third or inner disk one-tenth of a revolution for each complete revolution of the second disk, said revolution being the same and in the same ratio for either direction of the movement of the poise upon the beam.

In weighing an article the device is placed at zero on the scale-beam and its movement to that position will bring the zero-digit of each disk at the opening in the face-plate and the pawls to their normal positions, which is at the front edge of the face-plate projection 28, as seen in dotted lines in Figs. 8 and 11. The device being now moved out upon the beam to the desired pound-number, the units-disk will thereby be turned in the same direction nine-tenths of a revolution, which will carry its pawl from its normal position in front of the said fixed projection to a position at the rear edge of such projection, and coming in contact thereby will be pushed inward into the notch 40, and thereby engage the disk 4 with the disk 5. The two disks being thus engaged will rotate together one-tenth of a revolution, which will be only during the passing of the pawl over the surface of the said projection 28, and on leaving which the said pawl will be disengaged from the said second disk by the action of the spring forcing the pawl outward. The continued rotation of the units-disk operates in an identical manner the pawl of the disk 5, so as to engage the notch 50 of the inner disk 6, so as to turn it one unit, and then, and then only, the three disks are rotated together. The reverse movement of the device on the scale-beam will operate the registering-disks in the reverse order, so that when the device reaches its normal point on the beam the disks will show their normal zero positions at the face-opening.

It is obvious that other known systems of recording devices may be employed and actuated by the herein-described mechanism and that other forms and arrangements of actuating devices may be used without departing from the spirit of my invention so long as such actuating mechanism derives its function from the sliding movement of the device in contact with a resisting-surface and is connected with and operates value-indicators, which are co-operatively organized with a price-indicating device. It is also obvious that the rolls or wheels may be constructed with roughened surfaces to render their conjoint operation certain and effective and that the engagement of the primary roll with the computing-beam may be by rack and pinion. It is also obvious that the shape and construction of the casing or poise may be changed so long as it forms a closure for the computing mechanism and a seat for the scale-beam.

I claim as my invention—

1. A computing-poise device consisting, essentially, of a casing or frame adapted to slide upon a supporting-surface, a primary revoluble disk mounted in said frame, a primary roll or wheel fixed on one end of a spindle and engaging the said supporting-surface and said disk, a secondary roll movable axially on the other end of said spindle, having contact with and actuated by said primary disk, a registering mechanism at the face of the casing, and an adjusting device connecting the secondary roll with the said registering mechanism for changing the relation of the said secondary roll to the said primary disk, substantially in the way and for the purpose stated.

2. A computing device comprising a casing or frame, a registering mechanism, a rate-indicator, a traveling roll or wheel arranged to be operated in contact with a resistance-surface by moving the frame thereon, a disk in contact with and receiving motion from the said traveling roll or wheel, and a secondary roll in contact with and adapted to transmit the motion from the said disk to the registering mechanism and controlled by the said indicator to change its co-operative relation with the registering mechanism and the said disk to vary their relative speeds, substantially as described.

3. A computing device comprising a frame or casing adapted to slide upon a supporting-surface, a series of registering-disks, a central pointer or rate-indicator, a spindle in said casing having a fixed primary roll on one end adapted to engage said supporting-surface and a secondary axially-movable roll on the other end of said spindle, a primary disk in contact with both said rolls, a secondary disk in contact with said axially-movable roll and connected with the units-disk, and a device connecting said rate-indicator and axially-movable roll for changing the relation of the latter roll to the primary disk to vary the relative speed of the rotating elements, substantially as described, for the purpose stated.

4. In a computing device, the combination of a casing or frame, a registering and a rate-indicating mechanism, a traveling roll, a disk in contact with and receiving motion from said roll, and a secondary roll arranged to transmit motion from the said disk to the registering mechanism, the said secondary roll and disk being movable together and adapted to be actuated by the said indicator, whereby the relative speed of the traveling roll and the registering mechanism can be varied, substantially as described, for the purpose stated.

5. In a computing device, the combination of a casing or frame, a registering and a rate-indicating mechanism, a traveling roll, a primary and a secondary disk, the latter having connection with and adapted to actuate the registering mechanism, a spindle arranged between the two disks and fixed with said traveling roll, and a secondary roll mounted on the spindle and adapted to turn freely thereon and transmitting motion from the primary to the secondary disk and adapted to be moved on the said spindle by means of the said indicator device to vary the relative speed of the said disks, substantially as described.

6. In a computing device, the combination of the frame or casing, a registering mechanism, a rate-indicator, a traveling roll, a primary and a secondary disk, a spindle arranged between the two disks, adapted to revolve with the traveling roll, a secondary roll mounted on the spindle and constructed to transmit motion from the primary to the secondary disk, a stem or rod concentric with the registering mechanism and with the secondary disk having the rate-indicating pointer on its outer end and having a cam on its inner end, and a movable yoke-frame having positive engagement with said secondary roll and adapted to be moved by the said cam when operating the rate-indicator to change the relative location of the secondary roll with reference to the primary and the secondary disks, substantially as described.

7. In a computing device, the combination of a registering mechanism, a rate-indicator, a secondary disk having connection with and adapted to actuate the registering mechanism, and a traveling roll, of a movable yoke-frame constructed to be actuated by the rate-indicator and a primary disk mounted on and movable with the said yoke and receiving an initial movement from the said traveling roll carried by the said yoke-frame and adapted to transmit motion from the said primary to the secondary disk, substantially as described.

8. In a computing device, the combination of a registering mechanism composed of a series of concentric co-operative decimal-disks, a secondary disk having connection with the outer disk of the series of registering-disks, an indicator to denote the rate, and a traveling roll with a primary disk having engagement with and receiving motion from the traveling roll, a secondary roll for transmitting motion from the primary to the secondary disk, and a yoke-frame carrying the secondary roll and the primary disk and constructed to be actuated by the said rate-indicator, substantially as described.

9. A computing-poise comprising a fixed face-plate having a division of figures indicating prices, an opening to expose figures indicating values, and a radial projection 28, a series of registering-disks containing the value-figures, pawls pivoted at the circumference of said registering-disks, the pawl of one disk being adapted to extend within the path of and to engage the next disk of the series to cause them to move together, a central pointer for the price-indicating figures, and suitable mechanism for operating said disks by moving the poise in a right line with a rotating member of such mechanism in contact with a supporting-surface in the way described.

10. In a computing device, the combination, with the casing or frame having a projection 28 on the inner wall of its front face and a nested series of registering-disks having circumferential notches, of a series of pawls pivotally connected with said disks at one end and having their other ends adapted to engage with the notches in the disks adjacent to those carrying the pawls and normally held out of engagement with said notches and constructed to be pushed into the said notches when actuated by the said projection, substantially as described.

11. A computing-poise consisting, essentially, of a body or frame fitted with a seat to move upon a scale-beam, a wheel or roll rotated by contact with the scale-beam, a series of numbered disks operated by said roll, and a device for changing the relative motion of said disks, whereby different multiples of a given price may be obtained by moving the poise upon the beam, substantially as described.

12. The combination, with the beam or lever of a weighing-scale, of a computing-poise consisting, essentially, of a frame or body fitted to and adapted to be moved on said beam, a roll or wheel in contact with and rotated when moved upon said beam, a disk rotated by and diametrically adjustable to said roll, a second roll in contact with, receiving motion from, and moving with said disk, and a second disk receiving motion from said second roll and actuating the primary disk or plate of a decimally-multiple series of numbered disks, substantially as described.

13. The combination, with a frame or body of a computing-poise, of a primary roll or wheel adapted to operate in contact with a scale beam or lever, a yoke moving upon guides and bearing a primary disk in contact with and rotated by the primary roll and a secondary roll carried by said yoke in contact with and rotated by said disk, a secondary disk attached to and operating the outer one of a series of numbered concentric disks, and a cam rotatable within said yoke and operated by a pointer outside of said poise-frame, whereby said yoke, with its primary disk, is moved diametrically upon the primary roll and its secondary roll is moved diametrically upon the secondary disk and the relation to the motion of the numbered disks to the motion of the poise upon the beam is changed and regulated, and mechanism for automatically connecting the disks for operation in the way described.

14. The combination, with a poise frame or body and a scale-beam, of a primary roll adapted to operate in contact with said beam, a yoke moving on guides and bearing a primary disk in contact with and rotated by the primary roll, a secondary roll carried by said yoke in contact with and rotated by said disk, a secondary disk attached to and operating the outer one of a series of numbered concentric disks, a cam rotatable within said yoke and operated by a pointer outside of said poise-frame, and mechanism for automatically engaging said decimal-disks, whereby the outer disk is caused to move the second disk one-tenth of a revolution for each complete revolution of itself and the second moves the third one-tenth of a revolution for each complete revolution of the second, said revolution being the same and in the same ratio for either direction of the motion of the poise upon the beam.

15. In a computing-poise, the herein-described concentric series of numbered disks, the outer one of which is connected to and rotated with a vertically-adjustable and revoluble disk receiving motion from the moving of the poise, the outer ones of said disks provided with spring-pawls and decimally divided by peripheral notches 40 50 for the reception of the points of said pawls, in combination with the radial projection 28 upon the face-plate 2, whereby the said pawls are caused during the rotation of their respective disks to enter the notches 40 50 and cause the rotation of the inner disks during that portion of their rotation occupied in passing said pawls over the said radial projection 28, a scale-beam, and mechanism for connecting and operating said decimal-disks in the way and for the purpose stated.

16. The combination of a scale-beam with a weighing-scale, a poise having an interior seat adapting it to slide on said beam, concentric decimal-counting disks, mechanism for actuating the outer decimal-disk, mechanism for automatically connecting said decimal-disks, and mechanism for changing the relative motion of said disks, these said mechanisms co-operatively arranged within said poise for operation in the way described.

17. The combination, with a poise, of a series of concentric decimal-disks, the outer one whereof is fixed on and rotates with a central sleeve, the inner ones mounted rotatively on a fixed sleeve, a rod or stem within the fixed sleeve having a pointer on its outer end and a cam on its inner end, a disk on the inner end of the outer sleeve, a vertically-sliding yoke engaging said cam, a roll carried by said yoke engaging said disk, a disk carried by said yoke engaging said roll, a spindle having a roll engaging said last-named disk, a scale-beam engaging said last-named roll, mechanism for automatically engaging said disk, and a casing or frame having figures indicating the price and an opening to expose the value-figures of the decimal-disks.

18. The combination of a registering mechanism consisting of three concentric disks constructed to fit within each other, each having digits from "1" to "0," the two inner disks divided into ten equal divisions by circumferential notches, the outer or units disk 4, having a fixed relation to a rotative central sleeve 35, the two other disks 5 and 6 mounted rotatively on a fixed inner sleeve 36, in combination with a rod or stem 3, having a cam 18 on its inner end and a pointer 15 on its outer end, a disk 7 on the inner end of the outer sleeve, mechanism for actuating said disk, mechanism for varying the speed of its rotation, mechanism for automatically engaging and disengaging said disks, and a poise containing the above-stated operating mechanism, having a face-line of price-digits concentric with the arc described by the pointer, and a face-opening to expose the value-numerals of the decimal-disks, substantially as described.

19. A hollow sliding poise for a scale-beam, having face-numerals indicating prices and interior mechanism for indicating values exposed at the poise-face, mechanism for automatically operating said value-indicating devices by movement over and in contact with said beam, mechanism for automatically engaging and controlling the movements of the value-indicating mechanism, and coacting devices for varying the movements of the value-indicating mechanism operated by a price-pointer, substantially as described.

In testimony whereof I have hereunto signed this specification in the presence of witnesses.

JOHN WOODRUFF CULMER.

Witnesses:
  C. R. WYLIE,
  DELLA D. THOMAS.